United States Patent Office 3,576,918
Patented Apr. 27, 1971

3,576,918
PENTAERYTHRITOL HYDROGENATED
BISPHENOL A PHOSPHITES
Kenneth H. Rattenbury, Morgantown, W. Va., assignor
to Weston Chemical Corporation, New York, N.Y.
No Drawing. Filed Aug. 5, 1968, Ser. No. 749,943
Int. Cl. C07f 9/08
U.S. Cl. 260—927                                                12 Claims

ABSTRACT OF THE DISCLOSURE

Phosphites are prepared having one of the formulae:

(1) 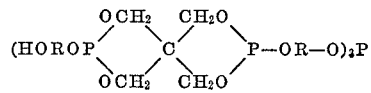

(2) 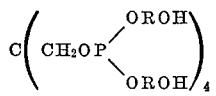

(3) 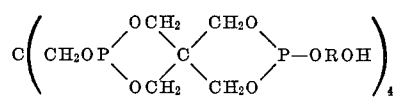

where R is the residue of a hydrogenated dihydric phenol, preferably hydrogenated bisphenol A.

The pentaerythritol can be replaced by dipentaerythritol or tripentaerythritol.

The compounds are useful as stabilizers, e.g. for rigid polyvinyl choride.

The present invention relates to novel phosphites.

It is an object of the present invention to prepare novel phosphites.

Another object is to develop novel stabilizers for hydrocarbon polymers, halogen containing polymers, natural and synthetic rubbers and other polymers.

A more specific object is to prepare stabilizers for rigid polyvinyl chloride resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having one of the formulae (1) 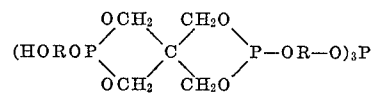

(2) 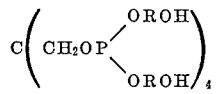

(3) 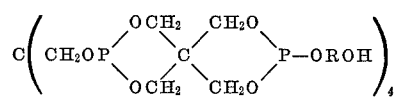

where R is the residue of a hydrogenated dihydric phenol, preferably hydrogeanted bisphenol A.

The phosphites are derivatives of pentaerythritol. In place of pentaerythritol there can be employed dipentaerythritol of tripentaerythritol to obtain product of similar character but of a mere complex nature. Also a portion of the pentaerythritol, e.g. 0.1 to 20 molar percent, can be replaced by dipentaerythritol or tripentaerythritol.

The products of the present invention can be prepared in several fashions.

Thus the compounds of Formula 1 can be prepared by reacting 2 moles of the hydrogenated dihydric phenol with 1 mole of a compound having the formula:

(a) 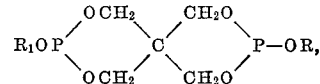

to form a product having the formula (b) 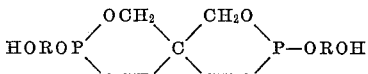

where R is aryl, haloaryl, alkyl or haloalkyl, and R is the residue of the hydrogenated dihydric phenol, and then reacting 3 moles of (b) with one mole of a compound having the formula $(R_1O)_3P$. In forcing compound (b) there are removed two moles of monohydric phenol or monohydric alcohol and in forming compound (1) there are removed 3 moles of monohydric phenol or monohydric alcohol. The starting phosphites preferably are such that the monohydric phenol or monohydric alcohol is one which has a lower boiling point than the hydrogenated dihydric phenol.

The compounds having Formula 2 are prepared by reacting 4 moles of a compound having the formula $(R_1O)_3P$ with 1 mole of pentaerythritol and 8 moles of the hydrogenated dihydric phenol and removing 12 moles of monohydric phenol or monohydric alcohol. Alternatively 8 moles of the hydrogenated dihydric phenol can be reacted with 1 mole of a compound (c) having the formula

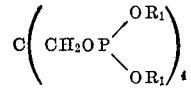

to form the compounds of Formula 2 while removing 8 moles of monohydric phenol or monohydric alcohol.

Analogous but mere complex compounds can be prepared by replacing the pentaerythritol in whole or in part, e.g. 0.1 to 20 mole percent, by dipentaerythritol or tripentaerythritol.

The compounds of Formula 3 are prepared by reacting 4 moles of compound (a) with one mole of pentaerythritol to form compound (d) having the formula

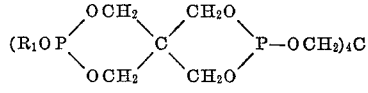

while removing 4 moles of phenol and then reacting compound (d) with 4 moles of the hydrogenated dihydric phenol while removing 4 moles of monohydric phenol or monohydric alcohol.

While the above reactions can be carried out at atmospheric pressure or super atmospheric pressure, they are preferaby carried out in a vacuum, e.g. 0.1 to 100 mm. pressure, usually at 5–15 mm. pressure, at the boiling point of the monohydric alcohol or monohydric phenol which is being removed.

Unless otherwise indicated, all parts and percentages are by weight.

The reactions set forth above are all preferably catalyzed with 0.1 to 5% based on the weight of the phosphite reactant or reactants of a catalyst which usually is a secondary phosphite, e.g. a dialkyl phosphite, a diaryl phosphite or a dihaloaryl phosphite or an alkaline catalyst. Examples of suitable catalysts are diphenyl phosphite, di (2-methylphenyl) phosphite, di(4-dodecylphenyl) phosphite, di(4 - octadecylphenyl) phosphite, di(2 - chlorophenyl) phosphite, di(2,4-dimethylphenyl) phosphite, di(4-bromophenyl) phosphite, diethyl phosphite, dicyclohexyl phosphite, phenyl 3-methylphenyl phosphite, dioctadecyl phosphite, dimethyl phosphite, sodium phenolate, sodium decylate, potassium p-cresylate, sodium ethylate, sodium octadeconolate sodium hydride, sodium metal, potassium metal, lithium methylate, sodium cetylate, trimethyl benzyl ammonium hydroxide and other quaternary ammonium hydroxides, sodium hydroxide, potassium hydroxide.

As starting compounds having the formula $(R_1O)_3P$ there can be used trimethyl phosphite, triethyl phosphite, triisopropyl phosphite, tributyl phosphite, trihexyl phosphite, tricyclohexyl phosphite, tris-decyl phosphite, trisisodecyl phosphite, diphenyl decyl phosphite, triphenyl phosphite, tri-p-cresyl phosphite, tri-o-cresyl phosphite, tri-4-dodecyl phenyl phosphite, tris(alpha naphthyl)phosphite, tri-2-chlorophenyl phosphite, tri-4-bromophenyl phosphite, tris(2 - chloroethyl)phosphite, tris(2 - chloroisopropyl) phosphite, tris(2-bromoethyl)phosphite, tris(o-cyclohexylphenyl) phosphite, tris(2-fluorophenyl)phosphite, tris(4-t-butylphenyl)phosphite, tris-octyl phosphite, diphenyl 4-methylphenyl phosphite, tris(2,4 - dichlorophenyl)phosphite.

Starting compounds having Formula (a) are disclosed for example in Hechenbleikner Pat. 2,847,443; Friedman Pat. 3,053,878, Baranauckus Pat. 3,310,609 and Gould Pat. 2,961,454. Illustrative of such starting compounds are diphenyl pentaerythritol diphosphite, didecyl pentaerythritol diphosphite, phenyl decyl pentaerythritol diphosphite, di(2-chloroethyl)pentaerythritol diphosphite, di-p-cresyl pentaerythritol diphosphite, di(2-chlorophenyl) pentaerythritol diphosphite, di(4 - bromophenyl) pentaerythritol diphosphite, dimethyl pentaerythritol diphosphite, di(4-t-butylphenyl)pentaerythritol diphosphite, di (2-dodecylphenyl)pentaerythritol diphosphite, di(4-octadecylphenyl)pentaerythritol diphosphite, dioctadecyl pentaerythritol diphosphite, di(o-cyclohexylphenyl)pentaerythritol diphosphite.

Starting compounds having Formula (c) are disclosed in the Hechenbleikner and Baranauckus patents set forth above. Illustrative of such starting compounds are octaphenyl pentaerythritol tetraphosphite, octa(decyl) pentaerythritol tetraphosphite, octa(4 - chlorophenyl)pentaerythritol tetraphosphite, tetraphenyl tetra(decyl)pentaerythritol tetraphosphite, octa(2 - methylphenyl)pentaerythritol tetraphosphite, octa(2 - chloroethyl)pentaerythritol tetraphosphite, octa(4 - dodecylphenyl)pentaerythritol tetraphosphite.

Starting compounds having Formula (d) include pentaerythrityl tetraphenyl pentaerythritol diphosphite, pentaerythrityl tetra(decyl) pentaerythritol diphosphite, pentaerythrityl diphenyl di(isodecyl) pentaerythritol diphosphite, pentaerythrityl tetra(2-chloroethyl)pentaerythritol diphosphite, pentaerythrityl tetra-p-cresyl pentaerythritol diphosphite, pentaerythrityl tetra(2-chlorophenyl)pentaerythritol diphosphite, pentaerythrityl tetra(4 - bromophenyl)pentaerythritol diphosphite, pentaerythrityl tetramethyl pentaerythritol diphosphite, pentaerythrityl tetra (4 - t - butylphenyl)pentaerythritol diphosphite, pentaerythrityl tetra(2-dodecylphenyl)pentaerythritol diphosphite, pentaerythrityl tetra(4 - octadecylphenyl)pentaerythritol diphosphite, pentaerythrityl tetra(octadecyl) pentaerythritol diphosphite, and pentaerythrityl tetra(o-cyclohexylphenyl)pentaerythritol diphosphite.

As used in the present specification and claims, the term hydrogenated dihydric phenol signifies that all of the aromatic double bonds have been completely hydrogenated. Examples of hydrogenated dihydric phenols used to form the products of the present invention are 4,4'-isopropylidene dicyclohexanol (also called bis(4-hydroxycyclohexyl)dimethyl methane or hydrogenated Bisphenol A), di(4-hydroxycyclohexyl)methyl ethyl methane, di(4-hydroxycyclohexyl) methane, di(4-hydroxycyclohexyl), bis(2-hydroxycyclohexyl)dimethyl methane, 1,4-dihydroxy cyclohexane, di(4-hydroxy-3-methylcyclohexyl)dimethyl methane, di(4-hydroxy-3-methylcyclohexyl)methyl methane, di(4-hydroxy-3-methyl cyclohexyl) cyclohexyl methane, di(4-hydroxycyclohexyl) sulfide, di(3-hydroxycyclohexyl)dimethyl methane, 4,4'-methylene bis(2-methyl-6-t-butyl-cyclohexanol), di(4-hydroxy-cyclohexyl)ether, 1,3-dihydroxycyclohexane, di(3-chloro-4-hydroxycyclohexyl) dimethyl methane.

The preferred starting hydrogenated dihydric phenols are bisphenols, the most preferred being hydrogenated Bisphenol A.

Illustrative of compounds within Formula 1 are tris(di (hydrogenated Bisphenol A) pentaerythritol diphosphite) phosphite, tris(di(di(4-hydroxycyclohexyl)methyl ethyl methane)pentaerythritol diphosphite)phosphite, tris(di(di (4 - hydroxycyclohexyl)methane)pentaerythritol diphosphite)phosphite, tris(di(di-(4-hydroxycyclohexyl))pentaerythritol diphosphite)phosphite, tris(di(bis(2-hydroxycyclohexyl)dimethyl methane) pentaerythritol diphosphite) phosphite, tris(di(1,4 - dihydroxycyclohexane) pentaerythritol diphosphite)phosphite, tris(di(di(4-hydroxy - 3 - methylcyclohexyl)dimethyl methane)pentaerythritol diphosphite)phosphite, tris(di(di(4-hydroxycyclohexyl)sulfide)pentaerythritol diphosphite)phosphite, tris(di(di(4-hydroxycyclohexyl)ether)pentaerythritol diphosphite)phosphite, tris(di(di(3 - chloro - 4 - hydroxycyclohexyl)dimethyl methane)pentaerythritol diphosphite)phosphite, tris(di(4,4'-methylene bis(2-methyl-6-t-butylcyclohexanol))pentaerythritol diphosphite)phosphite and bis(di(hydrogenated Bisphenol A) mono(di(di(4-hydroxycyclohexyl)methane)pentaerythritol diphosphite) phosphite.

Illustrative of compounds within Formula 2 are octa hydrogenated Bisphenol A pentaerythritol tetraphosphite, octa (di(4-hydroxycyclohexyl)methyl ethyl methane) pentaerythritol tetraphosphite, octa(di(4-dihydroxycyclohexyl)methane)pentaerythritol tetraphosphite, octa (di-(4-hydroxycyclohexyl))pentaerythritol tetraphosphite, octa(bis(2 - hydroxycyclohexyl)dimethyl methane)pentaerythritol tetraphosphite, octa(di(1,4 - dihydroxycyclohexane))pentaerythritol tetraphosphite, octa(di(4-hydroxy-3-methylcyclohexyl)dimethyl methane pentaerythritol tetraphosphite, octa di(4-hydroxycyclohexyl)sulfide)pentaerythritol tetraphosphite, octa(di(4-hydroxycyclohexyl) ether)pentaerythritol tetraphosphite, octa(di(3-chloro-4-hydroxycyclohexyl)dimethyl methane)pentaerythritol tetraphosphite, octa di(2-bromo-4-hydroxycyclohexyl)methane)pentaerythritol tetraphosphite, tetra hydrogenated Bisphenol A tetra(di(4-hydroxycyclohexyl)methyl ethyl methane)pentaerythritol tetraphosphite.

Illustrative of compounds within Formula 3 are pentaerythrityl tetra(hydrogenated Bisphenol A pentaerythritol diphosphite), pentaerythrityl tetra((di-4-hydroxycyclohexyl)methyl ethyl methane pentaerythritol diphosphite), pentaerythrityl tetra((di - 4 - hydroxycyclohexyl)methane pentaerythritol diphosphite), pentaerythrityl tetra((di-4-hydroxycyclohexyl)pentaerythritol diphosphite), pentaerythrityl tetra((bis-2-hydroxycyclohexyl)dimethyl methane pentaerythritol diphosphite), pentaerythrityl tetra-(1,4-dihydroxycyclohexane pentaerythritol diphosphite), pentaerythrityl tetra(di(4-hydroxy - 3 - methylcyclohexyl) dimethyl methane pentaerythritol diphosphite), pentaerythrityl tetra(di(4-hydroxycyclohexyl)sulfide pentaerythritol diphosphite), pentaerythrityl tetra(di(4-hydroxycyclohexyl)ether pentaerythritol diphosphite), pentaerythrityl tetra(di(3-chloro-4-hydroxycyclohexyl)dimethyl methane pentaerythritol diphosphite), pentaerythrityl di(hydrogenated Bisphenol A) (di(di(4-hydroxycyclohexyl) methane) pentaerythritol diphosphite).

The compounds of the present invention in general are substantially colorless solids. They are useful as heat and light stabilizers and as antioxidants. They appear to be more stable than the polymers prepared in Friedman Patent 3,053,878.

They can be readily ground for incorporation in an amount of 0.01 to 20% into various polymers such as halogen containing resins, e.g. vinyl chloride resins, as stabilizers against heat and light or as antioxidants. They are particularly useful in stabilizing rigid polyvinyl chloride resins where many other phosphites are unsuitable.

Examples of halogenated polymers which can be stabilized with the phosphites of the present invention include chlorinated polyethylene having about 14 to about 75%, e.g. 27% chlorine, polyvinyl chloride, polyvinylidene chloride, polyvinyl bromide, polyvinyl fluoride, polyvinylidene fluoride, polytetrafluoroethylene, copolymers of vinylidene chloride with acrylonitrile (e.g. 80:20) or vinyl chloride (e.g. 85.15), copolymers of vinyl chloride with 1 to 90%, preferably 1 to 40%, by weight of copolymerizable materials such as vinyl acetate, vinylidene chloride, vinylidene fluoride, diethyl fumarate, diethyl maleate and other alkyl fumarates and maleates, vinyl propionate, methyl acrylate, ethyl acrylate, butyl acrylate, 2-ethylhexylacrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-acrylonitrile (60:40), vinyl chloride-2-ethylhexyl acrylate (80:20). They can also be used to stabilize resins where the halogen-containing component is present in minor amount, e.g. acrylonitrile-vinyl chloride copolymer (85:15) or halogenated rubbers, e.g. polychloroprene, chlorinated polyisobutylene, chlorinated natural rubber, chlorine-containing polyurethanes, etc.

As is conventional in the art when the novel phosphites are employed with halogen containing resins there can be added barium, cadmium and zinc salts and synergistic activity is noted in this connection. Thus there can be included 0.5 to 10% of salts such as mixed barium-cadmium laurate, barium laurate, cadmium laurate, zinc stearate, cadmium 2-ethyl hexoate, barium nonylphenolate, barium octylphenolate, barium stearate, zinc octoate.

There can also be incorporated in the vinyl chloride resins and the like 0.5 to 10% of organotin compounds, particularly sulfur-containing compounds such as dibutyl-tin bis(octylthioglycollate).

Conventional phenolic antioxidants can also be incorporated in an amount of 0.1 to 10%, e.g. 2,2-methylene bis-(4-methyl - 6 - t - butylphenol), 2,4,6-tri-t-butylphenol, 4,4'-isopropylidene phenol, etc.

The novel phosphites of the present invention can also be incorporated in an amount of 0.01 to 20% as stabilizers for hydrocarbon polymers, including monoolefin polymers such as polyethylene, polypropylene, ethylene propylene copolymers (e.g. 80:20, 50:50, 20:80), ethylene-propylene terpolymers, e.g. ethylenepropylene-cyclooctadiene terpolymer, ethylene-butene-1 copolymer, ethylene-decene-1 copolymer, polystyrene, polyolefin, e.g. diolefin polymers such as natural rubber, rubbery butadiene styrene copolymer (75:25, 60:40) cis-isoprene polymer, polybutadiene, polyisobutylene, isobutylene-butadiene copolymer (butyl rubber, e.g. 97:3, 98.5:1.5). There can also be stabilized ABS rubbers and resins (acrylonitrile-butadiene-styrene terpolymers, e.g. 50:40:10).

They can be used in an amount of 0.01 to 20% to stabilize polyurethanes (e.g. from toluene diisocyanate and polypropylene glycol molecular weight 2025), polyesters, e.g. Dacron (polyethylene terephthalate), polymeric tetramethylene terephthalate-isophthalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a monoethylenically unsaturated compound, e.g. a terpolymer of butadiene, sulfur dioxide and styrene as set forth in Example 1 of Mosteret Patent 3,377,324, polycarbonates, e.g. the reaction product of Bisphenol A with phosgene or diphenyl carbonate as well as other polycarbonates set forth in Fritz Patent 3,305,520.

When incorporated in hydrocarbon polymers it is frequently advantageous to add conventional phenolic antioxidants as set forth above and conventional additives such as dilauryl thiodipropionate.

They are also useful as stabilizers for foods, oils, lubricants, and other products which deteriorate on oxidation.

The compounds of the invention are also useful as flame and fireproofing additives in polyurethane, hydrocarbon polymers, cellulose esters and ethers, e.g. cellulose acetate, methyl cellulose, ethyl cellulose, cellulose acetate-propionate, etc.

The field of greatest utility at the moment, however, appears to be as stabilizers for rigid vinyl chloride resins. Since the compounds of the present invention are monomeric with readily defined structures, it is surprising that they will act as stabilizers for rigid vinyl chloride resins since the only phosphites previously found to satisfactorily stabilize rigid polyvinyl chloride are polymeric phosphites. The rigid polyvinyl chloride resins normally do not contain over 10% plasticizer and can be completely devoid of plasticizer.

EXAMPLE 1

480 grams (2 moles) of hydrogenated Bisphenol A and 380 grams (1 mole) of diphenyl pentaerythritol diphosphite were heated in the presence of 3.8 grams of diphenyl phosphite as a catalyst and subjected to vacuum distillation at 5–10 mm. There were removed 188 grams (2 moles) of phenol. The residue in the pot was 672 grams (1 mole) of di(hydrogenated Bisphenol A) pentaerythritol diphosphite together with the diphenyl phosphite catalyst.

To the residue in the pot there were added 103.3 grams (⅓ mole) of triphenyl phosphite and the mixture heated in a vacuum at 5–10 mm. until 94 grams (1 mole) of phenol was removed. The residue in the pot consisted essentially of solid tris(di(dihydrogenated Bisphenol A)pentaerythritol diphosphite) phosphite together with a small amount of the catalyst as an impurity. The catalyst was removed by further heating in a vacuum to leave as a residue after cooling to room temperature the purified tris(di(hydrogenated Bisphenol A)pentaerythritol diphosphite)phosphite as a substantially colorless solid.

EXAMPLE 2

The procedure of Example 1 was repeated but the hydrogenated Bisphenol A was replaced by 2 moles of di(4-hydroxycyclohexyl) methane and the triphenyl phosphite was replaced by tris-isodecyl phosphite. The product obtained as a residue in the pot was tris(di(di(4-hydroxycyclohexyl)methane)pentaerythritol diphosphite) phosphite, a colorless solid.

The same product was obtained when the diphenyl phosphite catalyst was replaced by an equal amount of sodium phenolate.

EXAMPLE 3

The procedure of Example 1 was repeated but the hydrogenated Bisphenol A was replaced by di(4-hydroxycyclohexyl) ether. The product obtained as a solid residue in the pot was tris(di(di(4-hydroxycyclohexyl)ether pentaerythritol diphosphite)phosphite.

EXAMPLE 4

1240 grams (4 moles) of triphenyl phosphite, 136 grams (1 mole) of pentaerythritol and 1920 grams (8 moles) of hydrogenated Bisphenol A were heated together at 5–10 mm. with 12.5 grams of diphenyl phosphite catalyst. There were removed 1128 grams (12 moles) of phenol and the small amount of catalyst present was also removed by distillation. The solid residue was octa-hydrogenated Bisphenol A pentaerythritol tetraphosphite.

EXAMPLE 5

8 moles of hydrogenated Bisphenol A were heated with 1 mole of octaphenyl pentaerythritol tetraphosphite in the presence of 12 grams of sodium phenolate and then 8 moles of phenol were removed by distillation at 5–10 mm. The residue in the pot was octa-hydrogenated Bisphenol A pentaerythritol tetraphosphite.

To remove the sodium phenolate catalyst, the solid product was broken up into a powder and washed with a small amount of ethyl alcohol.

EXAMPLE 6

The procedure of Example 4 was repeated but the hydrogenated Bisphenol A was replaced by 8 moles of di(4-hydroxycyclohexyl)methyl ethyl methane to produce octa (di(4 - hydroxycyclohexyl)methyl ethyl methane)pentaerythritol tetraphosphite as a solid.

EXAMPLE 7

The procedure of Example 5 was repeated but the hydrogenated Bisphenol A was replaced by 8 moles of di(4-hydroxycyclohexyl)sulfide to produce octa(di(4-hydroxycyclohexyl)sulfide pentaerythritol tetraphosphite as a solid.

EXAMPLE 8

1520 grams (4 moles) of diphenyl pentaerythritol diphosphite were heated with 136 grams (1 mole) of pentaerythritol in the presence of 15 grams of diphenyl phosphite to form 1 mole of pentaerythrityl tetraphenyl pentaerythritol diphosphite while removing 376 grams (4 moles) of phenol by vacuum distillation at 5–10 mm.

There were then added to the pot residue 960 grams (4 moles) of hydrogenated Bisphenol A and heating was again initiated at 5–10 mm. to remove a further 376 grams (4 moles of phenol followed by heating to remove the catalyst. The solid residue obtained upon cooling was pentaerythrityl tetra(hydrogenated Bisphenol A pentaerythritol diphosphite).

EXAMPLE 9

The procedure of Example 8 was repeated but the hydrogenated Bisphenol A was replaced by 4 moles of di(4-hydroxycyclohexyl) to produce pentaerythrityl tetra((di-4-hydroxy-cyclohexyl)pentaerythritol diphosphite) as a solid.

EXAMPLE 10

The procedure of Example 8 was repeated but the hydrogenated Bisphenol A was replaced by 4 moles of di(4-hydroxy-3-methyl cyclohexyl)dimethyl methane to produce pentaerythrityl tetra(di(4-hydroxy - 3 - methylcyclohexyl)dimethyl methane pentaerythritol diphosphite) as a solid.

EXAMPLE 11

1 part of the tris(di(hydrogenated Bisphenol A)pentaerythritol diphosphite) phosphite prepared in Example 1 together with 2 parts of barium-cadmium laurate were mixed with 100 parts of rigid polyvinyl chloride to produce a stabilized product.

EXAMPLE 12

1 pint of the product of Example 1, together with 2 parts of calcium stearate were milled into 100 parts of polyvinyl chloride and 50 parts of dioctyl phthalate to give a stabilized product.

EXAMPLE 13

1 part of the octa-hydrogenated Bisphenol A pentaerythritol tetraphosphite produced in Example 5, together with 1.5 pints of barium-cadmium laurate were milled into rigid polyvinyl chloride on a two-roll mill for 10 minutes at 350° F. to produce a stabilized vinyl chloride resin.

EXAMPLE 14

1 part of the pentaerythrityl tetra(hydrogenated Bisphenol A pentaerythritol diphosphite) produced in Example 8 together with 2 parts of barium-cadmium laurate was milled into 100 parts of polyvinyl chloride to produce a stabilized product.

EXAMPLE 15

2 parts of the product of Example 1 and 1 part of 4,4'-isopropylidenebisphenol were mixed with 100 parts of solid polypropylene (melt index 0.8) to increase the oxidative stability of the polypropylene.

EXAMPLE 16

0.1 part of the product of Example 4, 0.3 part of dilauryl thiodipropionate and 4,4'-methylenebis(3-methyl-6-t-butylphenol) were added to 100 parts of solid polypropylene (melt index 0.8) to improve its oxidative resistance.

EXAMPLE 17

Example 16 was repeated replacing the product of Example 4 by 0.1 part of the product of Example 8 to produce a similarly stabilized polypropylene.

EXAMPLE 18

0.5 part of the product of Example 1 together with 0.5 part of 4,4'-thiobis(2-methyl-6-t-butylphenol) was milled into 100 parts of SBR rubber (60% butadiene-40% styrene) to give a stabilized product.

In the claims an S inside a ring indicates the ring is completely saturated.

While the phosphites of the present invention are effective stabilizers for both vinyl chloride resins and hydrocarbon polymers, many known phosphites which are stabilizers for vinyl chloride resins are relatively ineffective with hydrocarbon polymers, e.g. tridecyl phosphite and diphenyl decyl phosphite are not good stabilizers for hydrocarbon polymers. Unpredictability of stabilizer activity for phosphites is also shown in Buckley Patent 3,342,767; Fritz Patent 3,305,520.

I claim:

1. A phosphite having one of the formulae

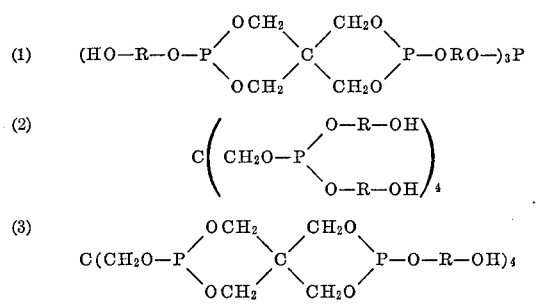

where —R— is the divalent residue of hydrogenated dihydric phenol from which the two hydroxyl groups have been removed, said hydrogenated dihydric phenol having 1 to 2 rings, any substituent on the rings being hydrogen, lower alkyl, chloro or bromo, any link between two rings being $(X)_n$ where X is O, S, $SO_2$ or

where $R_2$ and $R_3$ are hydrogen, lower alkyl or phenyl and $n$ is zero or one.

2. A phosphite according to claim 1 where the hydrogenated dihydric phenol residue is a residue having the formula

where $R_1$ is hydrogen or alkyl, X is O, S, $SO_2$ or

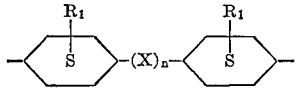

where $R_2$ and $R_3$ are hydrogen, lower alkyl or phenyl and $n$ is zero or one.

3. A phosphite according to claim 2 wherein the residue is the residue of 4,4'-isopropylidene dicyclohexanol.

4. A phosphite according to claim 1 having Formula 1.

5. A phosphite according to claim 4 wherein the hydrogenated dihydric phenol residue is a residue of alkylidene bisphenol.

6. A phosphite according to claim 4 wherein R is the residue of 4,4'-isopropylidene dicyclohexanol.

7. A phosphite according to claim 1 having Formula 2.

8. A phosphite according to claim 7 wherein the hydrogenated dihydric phenol residue is a residue of alkylidene bisphenol.

9. A phosphite according to claim 7 wherein R is the residue of 4,4'-isopropylidene bisphenol.

10. A phosphite according to claim 1 having Formula 3.

11. A phosphite according to claim 10 wherein the hydrogenated dihydric phenol residue is a residue of alkylidene bisphenol.

12. A phosphite according to claim 10 wherein R is the residue of 4,4'-isopropylidene bisphenol.

References Cited
UNITED STATES PATENTS

| | | | |
|---|---|---|---|
| 3,039,993 | 6/1962 | Friedman | 260—927X |
| 3,330,888 | 7/1967 | Friedman | 260—927 |
| 3,457,331 | 7/1969 | Friedman | 260—928X |

CHARLES B. PARKER, Primary Examiner

R. L. RAYMOND, Assistant Examiner

U.S. Cl. X.R.

260—45.95, 928, 929